(12) United States Patent
Lee

(10) Patent No.: US 12,538,003 B2
(45) Date of Patent: Jan. 27, 2026

(54) IMAGING DEVICE WITH LIGHT EMITTER AND ELECTRONIC EQUIPMENT HAVING THE SAME

(71) Applicant: TRIPLE WIN TECHNOLOGY(SHENZHEN) CO. LTD., Shenzhen (CN)

(72) Inventor: Yen-Tsun Lee, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 160 days.

(21) Appl. No.: 18/236,893

(22) Filed: Aug. 22, 2023

(65) Prior Publication Data

US 2024/0406524 A1    Dec. 5, 2024

(30) Foreign Application Priority Data

May 29, 2023  (CN) .......................... 202310614750.7

(51) Int. Cl.
*H04N 23/51* (2023.01)
*B60R 11/04* (2006.01)
(Continued)

(52) U.S. Cl.
CPC ............. *H04N 23/51* (2023.01); *G01S 7/481* (2013.01); *G01S 17/894* (2020.01); *G03B 30/00* (2021.01);
(Continued)

(58) Field of Classification Search
CPC ........ H04N 23/50; H04N 23/51; H04N 23/52; H04N 23/54; H04N 23/55; H04N 23/56; H04N 23/57; G01S 7/481; G01S 7/4811; G01S 7/4812; G01S 7/4813; G01S 17/894; G03B 17/02; G03B 30/00; G03B 2217/00; G03B 2217/002; H04M 1/0264; G06F 1/1686; B60R 11/04; H05K 5/0026; H05K 5/0034; H05K 5/0047; H05K 5/069

See application file for complete search history.

(56) References Cited

U.S. PATENT DOCUMENTS

2008/0095529 A1* 4/2008 Hsu .................... G03B 17/28
                                                        348/E5.025
2012/0133956 A1* 5/2012 Findlay ............... H03K 17/941
                                                        257/E31.127

(Continued)

*Primary Examiner* — Twyler L Haskins
*Assistant Examiner* — Akshay Trehan
(74) *Attorney, Agent, or Firm* — ScienBiziP, P.C.

(57) ABSTRACT

An imaging device includes a substrate, a light emitting member, a light receiving member, a cover assembly, and a sealing member. The cover assembly includes a cover plate, a side plate, and a spacer. The side plate cooperates with the cover plate to define a groove, the substrate cooperates with the cover assembly to seal the groove. The spacer is connected to the cover plate and the side plate and separates the groove to form a first space and a second space. A first through hole and a second through hole are defined by the cover plate and respectively communicate with the first space. The light emitting member is received in the first space, the light receiving member is received in the second space. A slot is recessed inwardly from an end surface of the spacer facing away from the cover plate. The sealing member is filled in the slot.

20 Claims, 5 Drawing Sheets

(51) Int. Cl.

| | |
|---|---|
| *G01S 7/481* | (2006.01) |
| *G01S 17/894* | (2020.01) |
| *G03B 17/02* | (2021.01) |
| *G03B 30/00* | (2021.01) |
| *G06F 1/16* | (2006.01) |
| *H04M 1/02* | (2006.01) |
| *H04N 23/52* | (2023.01) |
| *H04N 23/54* | (2023.01) |
| *H04N 23/55* | (2023.01) |
| *H04N 23/56* | (2023.01) |
| *H04N 23/57* | (2023.01) |

(52) U.S. Cl.
CPC ............ *H04N 23/52* (2023.01); *H04N 23/54* (2023.01); *H04N 23/55* (2023.01); *H04N 23/56* (2023.01); *H04N 23/57* (2023.01); *B60R 11/04* (2013.01); *G03B 17/02* (2013.01); *G06F 1/1686* (2013.01); *H04M 1/0264* (2013.01)

(56) References Cited

U.S. PATENT DOCUMENTS

| | | | |
|---|---|---|---|
| 2012/0230670 A1* | 9/2012 | Hirooka | H10F 39/011 |
| | | | 156/60 |
| 2020/0146603 A1* | 5/2020 | Schwalenberg | G01N 21/474 |
| 2021/0185804 A1* | 6/2021 | Huang | G01S 7/4813 |
| 2021/0195076 A1* | 6/2021 | Chen | G01S 17/894 |
| 2022/0086417 A1* | 3/2022 | Wang | G01B 11/22 |
| 2022/0224819 A1* | 7/2022 | Xu | H04N 7/015 |
| 2023/0078421 A1* | 3/2023 | Han | H04N 23/57 |
| | | | 348/135 |

\* cited by examiner

IMAGING DEVICE WITH LIGHT EMITTER AND ELECTRONIC EQUIPMENT HAVING THE SAME

FIELD

The subject matter herein generally relates to fields of imaging technology, and in particular, to an imaging device and an electronic device having the imaging device.

BACKGROUND

During the process of receiving signals, an imaging device is easily affected by the signal emitted by the imaging device, resulting in signal interference in the imaging device and affecting the imaging effect of the imaging device.

BRIEF DESCRIPTION OF THE DRAWINGS

Implementations of the present disclosure will now be described, by way of embodiments, with reference to the attached figures.

DETAILED DESCRIPTION

Figure 1:
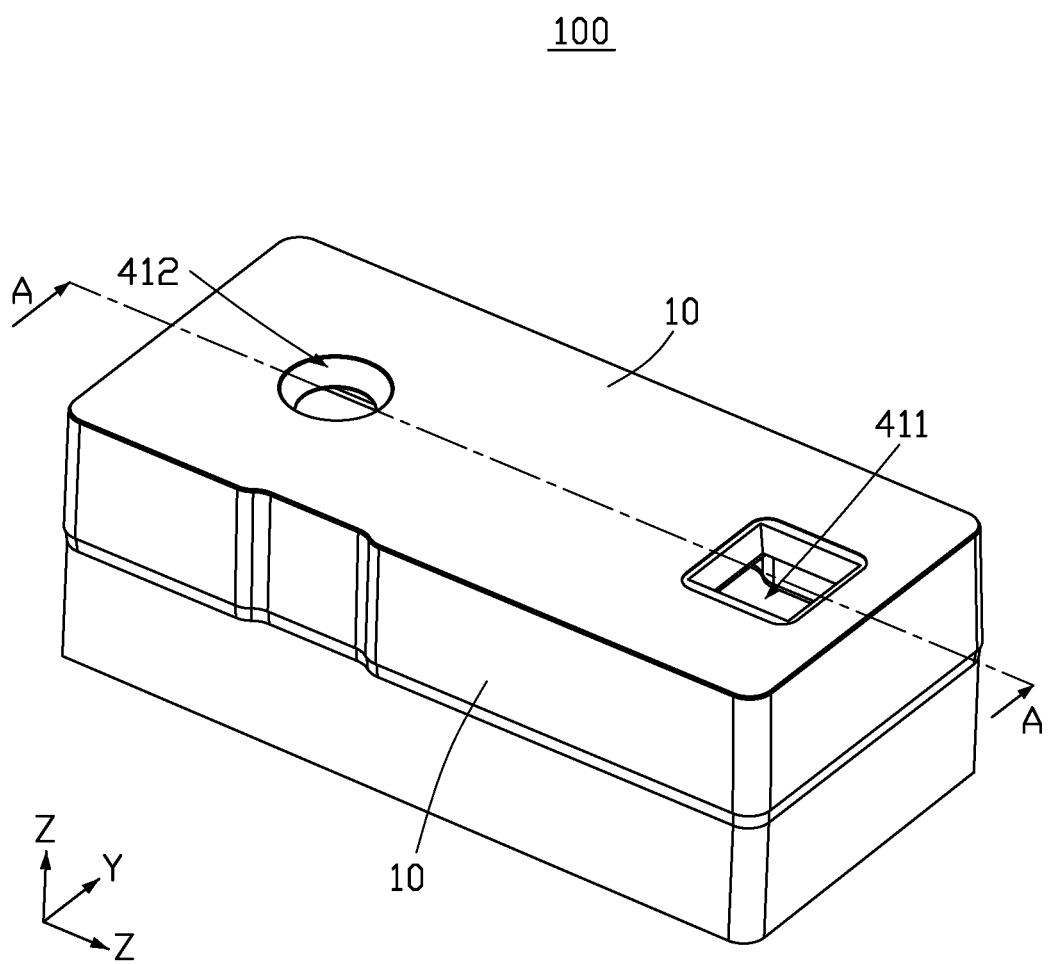
FIG. 1 is a diagram of an embodiment of an imaging device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
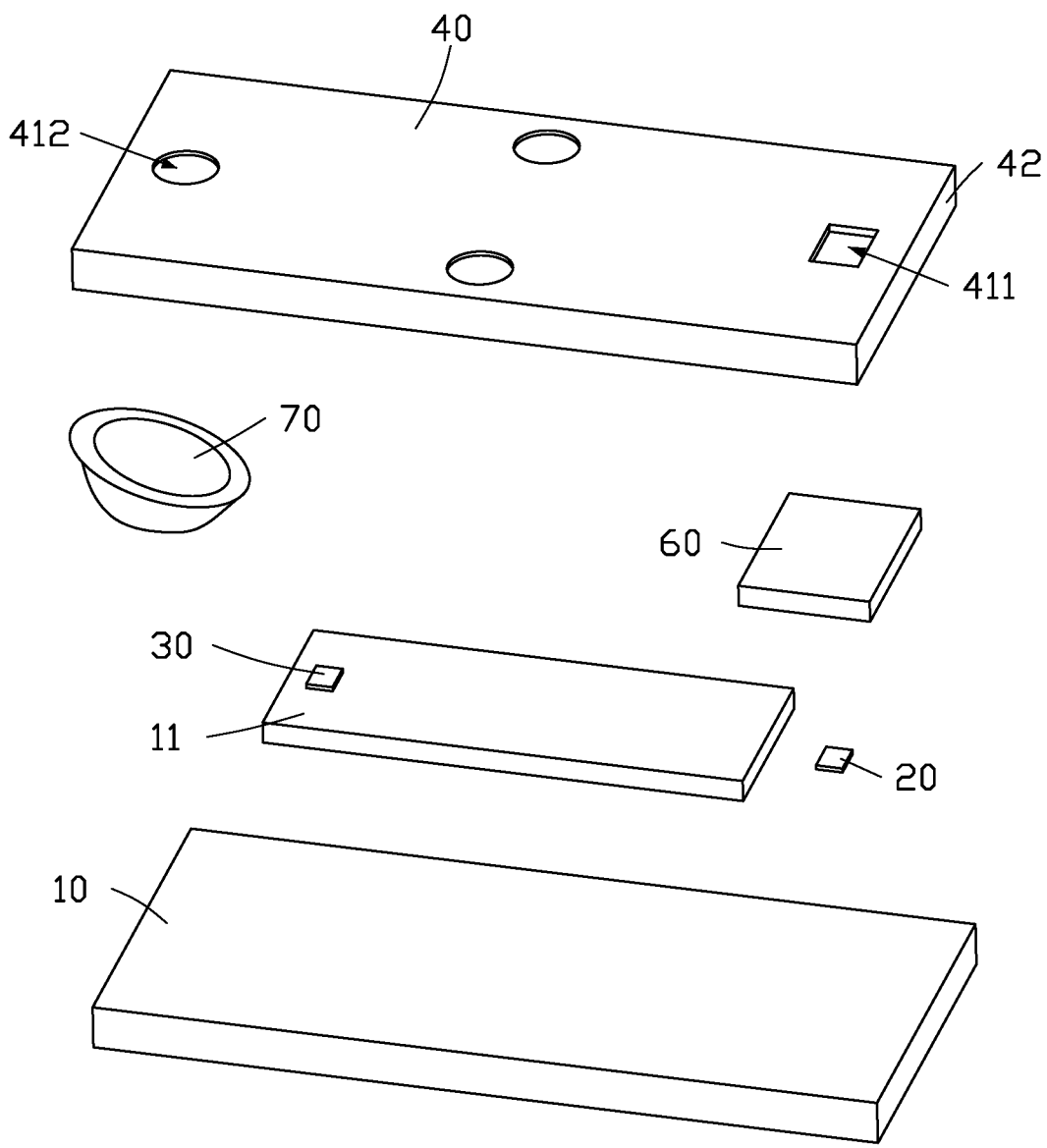
FIG. 2 is an exploded, diagrammatic view of an embodiment of an imaging device according to the present disclosure.
Figure 3:
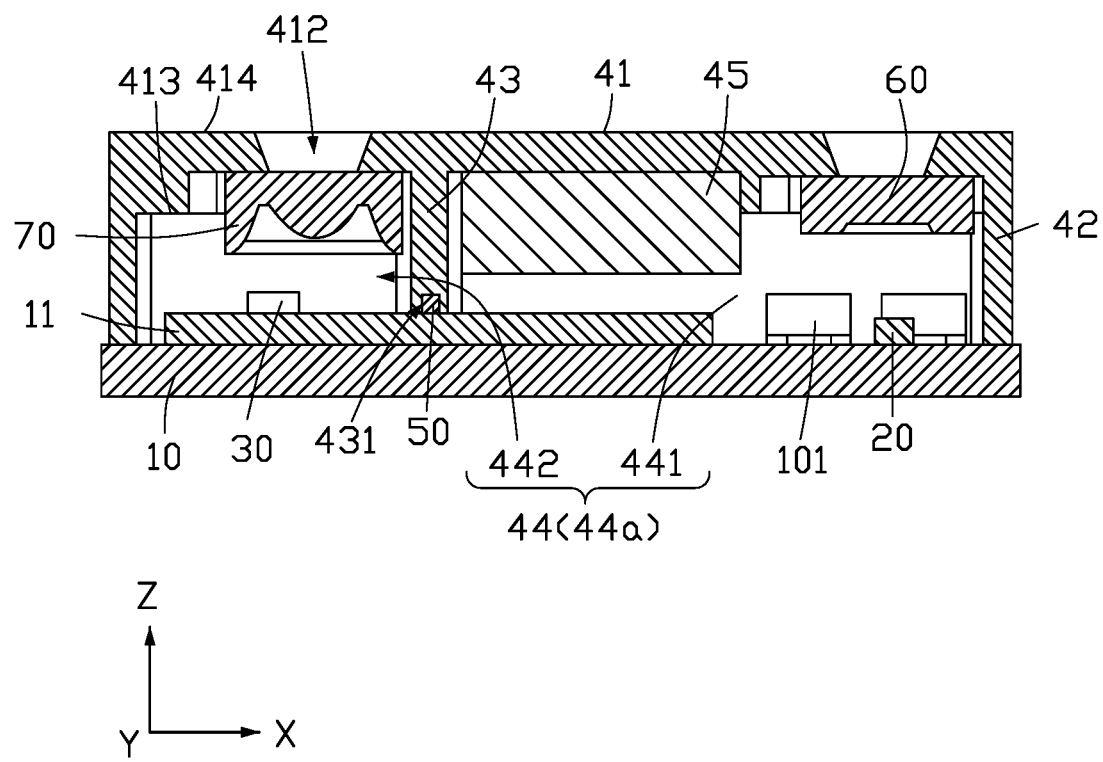
FIG. 3 is a cross-sectional view of an embodiment of the imaging device of FIG. 1, taken along a view line of A-A line.

FIG. 1 illustrates an embodiment of an imaging device 100. Referring to FIG. 1, FIG. 2, and FIG. 3, the imaging device 100 includes a substrate 10, a light emitting element 20, a light receiving element 30, a cover assembly 40, and a sealing member 50. In at least one embodiment, the substrate 10 may be a circuit board. The imaging device 100 may be a Time of Flight (TOF) camera, which calculates a distance information of a target object by calculating a time difference between a time when the light emitting unit 20 emits an irradiating light and a time when the light receiving unit 30 receives a reflected light. The light emitting element 20 may be LED or laser. The light receiving element 30 may be a dot-matrix photosensitive sensor such as a CMOS sensor.

The light emitting element 20 is connected to the substrate 10 and the light emitting element 20 is configured to emit the irradiating light to irradiate a target area.

The light receiving element 30 is connected to the substrate 10, the light receiving element 30 is located on a side of the light emitting element 20 and spaced apart from the light emitting element 20. The light receiving element 30 is configured to receive natural light and reflected light of the irradiating light reflected by a target object in the target area to generate image information and distance information of the target object.

The cover assembly 40 is connected to the substrate 10 and covers the light emitting element 20 and the light receiving element 30. The cover assembly 40 includes a cover plate 41 a side plate 42, and a spacer 43. The side plate 42 is connected to a periphery of the cover plate 41 and cooperates with the cover plate 42 to form a groove 44a. The substrate 10 cooperates with the cover assembly 40 to seal the groove 44a to form a cavity 44.

The spacer 43 is received in the groove 44a. The spacer 43 is connected to the cover plate 41 and the side plate 42 and separates the groove 44a to form a first space 441 and a second space 442. A first through hole 411 is defined by the cover plate 41 and communicates with the first space 441. The light emitting member 20 is received in the first space 441, and the first through hole 411 is configured to allow the irradiating light emitted by the light emitting member 20 to pass through. A second through hole 412 is defined by the cover plate 41 and communicates with the second space 442. The light receiving member 30 is received in the second space 442, and the second through hole 412 is configured to allow the natural light and the reflected light to pass through. The spacer 43 separates the first space 441 and the second space 442, thereby reducing a risk of mutual influence between the light emitting member 20 and the light receiving member 30 during the process of emitting the irradiating light and receiving the reflected light.

A slot 431 is recessed inwardly from an end surface of the spacer 43 facing away from the cover plate 41. The sealing member 50 is filled in the slot 431 and abuts against the substrate 10. The slot 431 increases a contact area between the cover assembly 40 and the sealing member 50. In at least one embodiment, the sealing member 50 may be colloid made of opaque material.

In at least one embodiment, the sealing member 50 may further filled between an end surface of the side plate 42 facing away from the cover plate 41 and the substrate 10 to improve a connection strength between the substrate 10 and the cover assembly 40.

In the above imaging device 100, the spacer 43 may reduce a risk of mutual influence between the irradiating light emitted by the light emitting member 20 and the reflected light received by the light receiving member 30. A slot 431 is provided on the spacer 43 to receive the sealing member 50, which is convenient to improve the sealing performance of the sealing member 50, and may further reduce the risk of mutual influence between the irradiating light emitted by the light emitting member 20 and the reflected light received by the light receiving member 30, thereby reducing a risk of signal interference in the imaging device 100.

In at least one embodiment, a cross section of the slot 431 perpendicular to a second direction Y may be rectangular, the second direction Y perpendicular to the spacer 43 and parallel to the substrate 10, so that the sealing member 50 filled in the rectangular slot 431 increases the contact area between the spacer 43 and the substrate 10, and reduces a risk of the irradiating light emitted by the light emitting member 20 passing through a gap between the spacer 43 and the substrate 10 and directly transmitted to the light receiving member 30.

In at least one embodiment, the cross section of the slot 431 along the second direction Y may be trapezoidal or arcuate.

Referring to FIG. 1, FIG. 2, and FIG. 3, in at least one embodiment, the cover plate 41 includes a first surface 413 and a second surface 414 spaced from a first direction Z. The first surface 413 faces the substrate 10, and the second surface 414 faces away from the substrate 10. The first direction Z is perpendicular to the second direction Y. The spacer 43 is located on a side of the first surface 413 facing away from the second surface 414.

The substrate 10 is provided with a chip 11, the chip 11 faces the cover plate 41. The end surface of the spacer 43 facing away from the first surface 413 is connected to the chip 11.

Referring to FIG. 1, FIG. 2, and FIG. 3, in at least one embodiment, the imaging device 100 may further include a first lens assembly 60 and a second lens assembly 70. The first lens assembly 60 is received in the first space 441 and exposed from the first through hole 411. The first lens assembly 60 corresponds the light emitting member 20, so that the irradiating light emitted by the light emitting member 20 passes through the first lens assembly 60. The first lens assembly 60 may be a plane lens, which may better diffuse the irradiating light emitted by the light emitting member 20 to the target area.

The second lens assembly 70 is received in the second space 442 and exposed from the second through hole 412. The second lens assembly 70 corresponds the light receiving member 30, so that the natural light and the reflected light pass through the second lens assembly 70. The second lens assembly 70 may be a convex lens, which may better concentrate and receive the natural light and the reflected light reflected by the target in the target area.

In at least one embodiment, a diameter of the first through hole 411 gradually decreases from the second surface 414 toward the first surface 413, so that the irradiating light emitted by the light emitting member 20 can diverge through the first through hole 411. In at least one embodiment, the first through hole 411 may be a tapered hole or a pyramidal hole.

A diameter of the second through hole 412 gradually decreases from the second surface 414 toward the first surface 413, so that the natural light and the reflected light reflected by the target in the target area can be concentrated on the light receiving unit 30 through the second through hole 412. In at least one embodiment, the second through hole 412 may be a tapered hole or a pyramidal hole.

In at least one embodiment, the imaging device 100 may further include a plurality of electronic components 80 connected to the substrate 10 and a plurality bonding wires (not shown) bonded between the plurality of electronic components 80.

Referring to FIG. 1, FIG. 2, and FIG. 3, in at least one embodiment, a protrusion 45 is received in the first space 411, and the protrusion 45 protrudes from the first surface 413 toward the substrate 10. Along the first direction Z, the protrusion 45 is spaced apart from the light emitting member 20. When the light emitting member 20 emits the irradiating light to the target area, the protrusion 45 blocks a part of the irradiating light emitted by the light emitting member 20 from diverging to the spacer 43, thereby reducing the risk of the light passing through the spacer 43 to the light receiving member 30.

Figure 4:
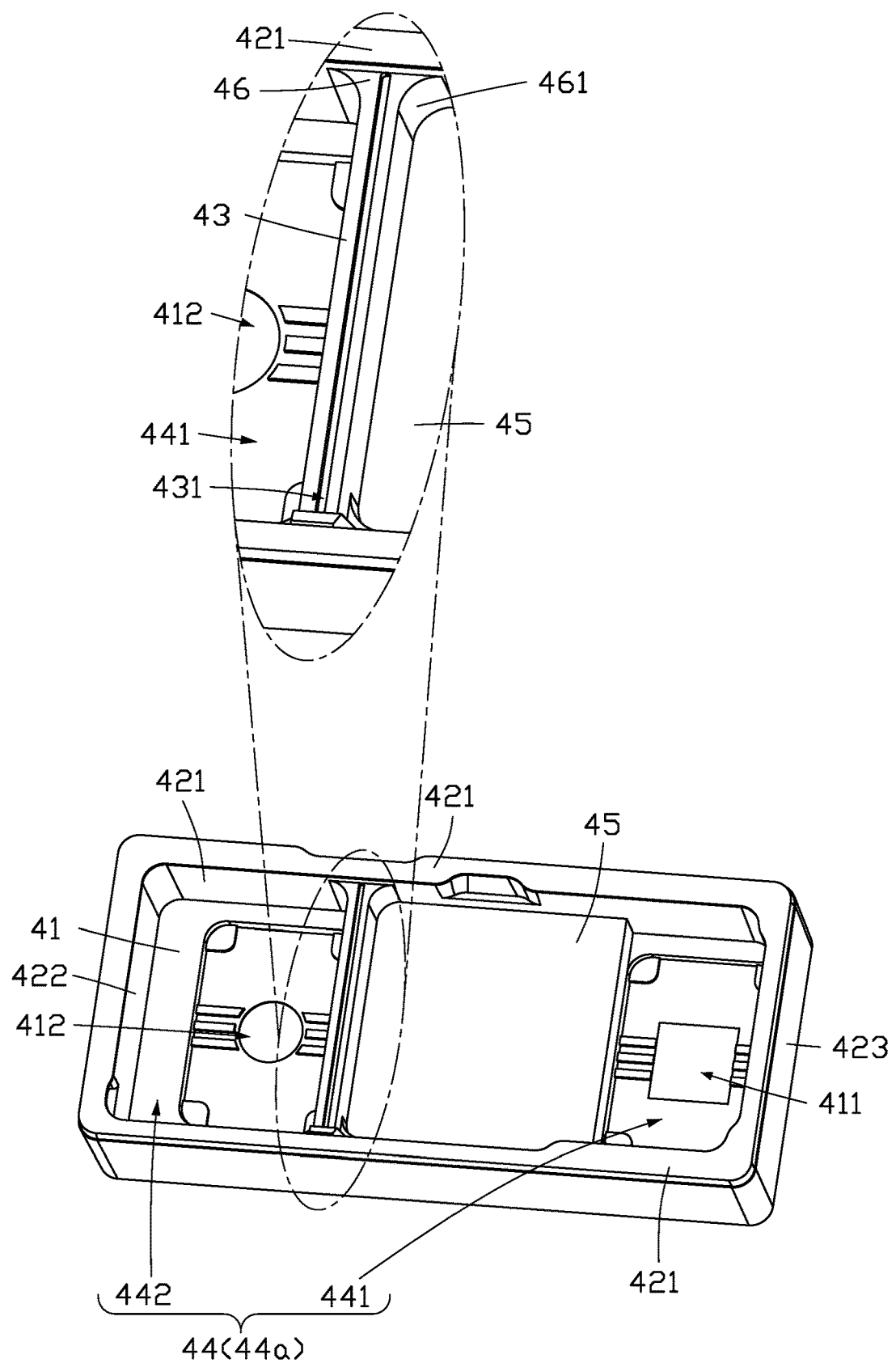
FIG. 4 is a diagram of an embodiment of a cover assembly according to the present disclosure.

Referring to FIG. 3 and FIG. 4, in at least one embodiment, the side plate 42 may include two first side walls 421, a second side wall 422, and a third side wall 423. The first side walls 421 are spaced from each other along the second direction Y, the second side wall 422 and the third side wall 423 are spaced from each other along the third direction X. The third direction X is perpendicular to the first direction Z and the second direction Y. One of the first side walls 421, the second side wall 422, another of the first side walls 421, and the third side wall 423 are connected end to end in that sequence. The spacer 43 connects the first side walls 421 to separate the groove 44a into the first space 441 and the second space 442.

Opposite end portions of the protrusion 45 in the second direction Y may be respectively connected to one of the first side walls 421.

In the first direction Z, a distance between the substrate 10 and the spacer 43 may be less than a distance between the substrate 10 and the protrusion 45. The protrusion 45 blocks the irradiating light emitted by the light emitting member 20 to be transmitted to the spacer 43, and the spacer 43 further blocks the irradiating light emitted by the light emitting member 20 that the protrusion 45 fails to block.

Referring to FIG. 1 and FIG. 4, in at least one embodiment, the cover assembly 40 may further include a reinforcing part 46 connected between the spacer 43 and each of the first side walls 421 to improve the structure strength og the spacer 43. The reinforcing part 46 includes an arcuate surface 461.

Figure 5:
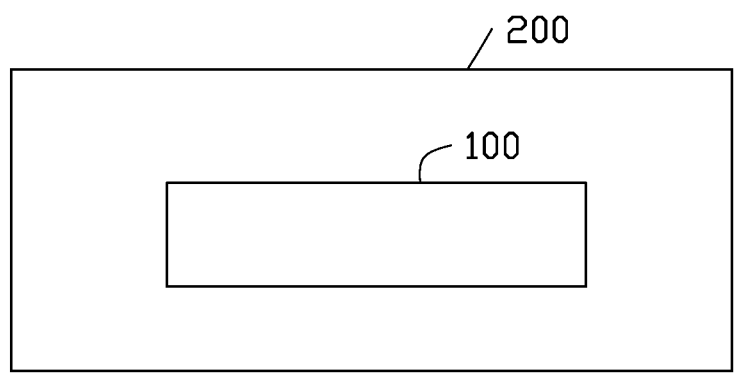
FIG. 5 is a diagram of an embodiment of an electronic device according to the present disclosure.

FIG. 5 illustrates an embodiment of an electronic device 200. The electronic device 200 includes the above imaging device 100. The electronic device 200 may be a hearing aid, a vision aid, a video measuring instrument, a mobile phone, and the like.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An imaging device comprising:
   a substrate;
   a light emitting member connected to the substrate and configured to emit irradiating light to irradiate a target area;
   a light receiving member connected to the substrate and spaced apart from the light emitting member, the light receiving member being configured to receive natural light and reflected light of the irradiating light reflected by a target object in the target area;
   a cover assembly connected to the substrate and covering the light receiving member and the light emitting member, wherein the cover assembly comprises a cover plate, a side plate, and a spacer, the side plate is connected to a periphery of the cover plate and cooperates with the cover plate to define a groove, the substrate cooperates with the cover assembly to seal the groove to define a cavity, the spacer is received in the groove, the spacer is connected to the cover plate and the side plate and separates the groove to form a first space and a second space, a first through hole is defined by the cover plate and communicates with the first space, the light emitting member is received in the first space and the first through hole is configured to allow the irradiating light to pass through, a second through hole is defined by the cover plate and communicates with the second space, the light receiving member is received in the second space and the second through hole is configured to allow the natural light and the reflected light to pass through, a slot is recessed inwardly from an end surface of the spacer facing away from the cover plate, the cover assembly further comprises a reinforcing part with an arcuate surface connected between the spacer and the side plate to improve the structure strength of the spacer;
    a first lens assembly received in the first space and exposed from the first through hole, wherein the first lens assembly is a plane lens and corresponds to the light emitting member; and
    a sealing member filled in the slot and abutting against the substrate.

2. The imaging device of claim 1, wherein the cover plate comprises a first surface facing the substrate and a second surface facing away from the first surface in a first direction, the cover assembly further comprises a protrusion received in the first space, the protrusion protrudes s from the first surface toward the substrate, and the protrusion and the light emitting member are spaced apart from each other in the first direction.

3. The imaging device of claim 2, wherein the side plate comprises two first side walls arranged at intervals in a second direction, a second side wall, and a third side wall, the second side wall and the third side wall are arranged at intervals in a third direction, the first direction, the second direction, and the third direction are perpendicular to each other, the spacer is connected to the first surface of the cover plate and connects the first side walls, and the reinforcing part is connected between the spacer and each of the first side walls.

4. The imaging device of claim 3, wherein the protrusion connects the first side walls.

5. The imaging device of claim 4, wherein in the first direction, a distance between the substrate and the spacer is less than a distance between the substrate and the protrusion.

6. The imaging device of claim 3, wherein a cross section of the slot perpendicular to the second direction is rectangular.

7. The imaging device of claim 3, wherein the cover assembly further comprises a reinforcing part connected between the spacer and each of the first side walls.

8. The imaging device of claim 2, wherein a diameter of the first through hole decreases from the second surface toward the first surface.

9. The imaging device of claim 2, wherein a diameter of the second through hole decreases from the second surface toward the first surface.

10. The imaging device of claim 1, wherein the imaging device further comprises a second lens assembly, the second lens assembly is received in the second space and exposed from the second through hole, the second lens assembly corresponds the light receiving member.

11. An electronic device comprising:
    an imaging device comprising:
        a substrate;
        a light emitting member connected to the substrate and configured to emit irradiating light to irradiate a target area;
        a light receiving member connected to the substrate and spaced apart from the light emitting member, the light receiving member being configured to receive natural light and reflected light of the irradiating light reflected by a target object in the target area;
        a cover assembly connected to the substrate and covering the light receiving member and the light emitting member, wherein the cover assembly comprises a cover plate, a side plate, and a spacer, the side plate is connected to a periphery of the cover plate and cooperates with the cover plate to define a groove, the substrate cooperates with the cover assembly to seal the groove to define a cavity, the spacer is received in the groove, the spacer is connected to the cover plate and the side plate and separates the groove to form a first space and a second space, a first through hole is defined by the cover plate and communicates with the first space, the light emitting member is received in the first space and the first through hole is configured to allow the irradiating light to pass through, a second through hole is defined by the cover plate and communicates with the second space, the light receiving member is received in the second space and the second through hole is configured to allow the natural light and the reflected light to pass through, a slot is recessed inwardly from an end surface of the spacer facing away from the cover plate, the cover assembly further comprises a reinforcing part with an arcuate surface connected between the spacer and the side plate to improve the structure strength of the spacer;
        a first lens assembly received in the first space and exposed from the first through hole, wherein the first lens assembly is a plane lens and corresponds to the light emitting member; and
        a sealing member filled in the slot and abutting against the substrate.

12. The electronic device of claim 11, wherein the cover plate comprises a first surface facing the substrate and a second surface facing away from the first surface in a first direction, the cover assembly further comprises a protrusion received in the first space, the protrusion protrudes s from the first surface toward the substrate, and the protrusion and the light emitting member are spaced apart from each other in the first direction.

13. The electronic device of claim 12, wherein the side plate comprises two first side walls arranged at intervals in a second direction, a second side wall, and a third side wall, the second side wall and the third side wall are arranged at intervals in a third direction, the first direction, the second direction, and the third direction are perpendicular to each other, the spacer is connected to the first surface of the cover plate and connects the first side walls, and the reinforcing part is connected between the spacer and each of the first side walls.

14. The electronic device of claim 13, wherein the protrusion connects the first side walls.

15. The electronic device of claim 14, wherein in the first direction, a distance between the substrate and the spacer is less than a distance between the substrate and the protrusion.

16. The electronic device of claim 13, wherein a cross section of the slot perpendicular to the second direction is rectangular.

17. The electronic device of claim 13, wherein the cover assembly further comprises a reinforcing part connected between the spacer and each of the first side walls.

18. The electronic device of claim 12, wherein a diameter of the first through hole decreases from the second surface toward the first surface.

19. The electronic device of claim 12, wherein a diameter of the second through hole decreases from the second surface toward the first surface.

20. The electronic device of claim 11, wherein the imaging device further comprises a second lens assembly, the second lens assembly is received in the second space and exposed from the second through hole, the second lens assembly corresponds the light receiving member.

* * * * *